United States Patent [19]

Randahl

[11] Patent Number: 5,553,132
[45] Date of Patent: Sep. 3, 1996

[54] METHOD AND AN ARRANGEMENT FOR GENERATING A RINGING SIGNAL

[75] Inventor: Torbjorn I. Randahl, Nacka, Sweden

[73] Assignee: Telefonaktiebolaget LM Ericsson, Stockholm, Sweden

[21] Appl. No.: 375,687

[22] Filed: Jan. 20, 1995

[30]     Foreign Application Priority Data

Jan. 21, 1994 [SE] Sweden ................................ 9400185

[51] Int. Cl.⁶ ............................ H04M 3/00; H04M 9/00
[52] U.S. Cl. ................................ 379/252; 379/401
[58] Field of Search .................................. 379/251, 252, 379/253, 254, 255, 399, 400, 401, 373, 375, 418

[56]         References Cited

U.S. PATENT DOCUMENTS

| | | | |
|---|---|---|---|
| 3,689,700 | 9/1972 | Lent | 379/400 X |
| 3,723,662 | 3/1973 | Macrander | 379/400 X |
| 4,152,670 | 5/1979 | Rimondini et al. | 379/253 X |
| 4,370,526 | 1/1983 | Schoofs et al. | 379/253 |
| 4,961,222 | 10/1990 | Johansson et al. | 379/413 |

FOREIGN PATENT DOCUMENTS 2102249   1/1983   United Kingdom.

OTHER PUBLICATIONS

PBL 3764, Ericsson, "Subscriber Line Interface Circuit", May 1993.
PBL 3765, Ericsson, "Subscriber Line Interface Circuit", Jan. 1989.
PBL 3766, Ericsson, "Subscriber Line Interface Circuit", May 1993.
HC 5513, Harris Semiconductor, "Subscriber Line Interface Circuit", Nov. 1995.

*Primary Examiner*—Jeffery Hofsass
*Assistant Examiner*—Harry S. Hong
*Attorney, Agent, or Firm*—Burns, Doane, Swecker & Mathis, L.L.P.

[57]           ABSTRACT

To generate a ringing signal by means of a subscriber line interface circuit having two final stages, each for supplying an individual subscriber line wire, one of the subscriber line wires is connected to one of the input terminals of an operational amplifier, the other input terminal of which being connected to the interconnecting point between two series connected resistors having the same resistance. The output terminal of the operational amplifier is connected, via a first resistor, to a current input terminal of the subscriber line interface circuit for generating a first current. A signal generator, via a second resistor, is also connected to said current input terminal for generating a second current. The final stages of the subscriber line interface circuit are supplied with current from current input terminal to drive the final stages to generate the ringing signal.

4 Claims, 3 Drawing Sheets

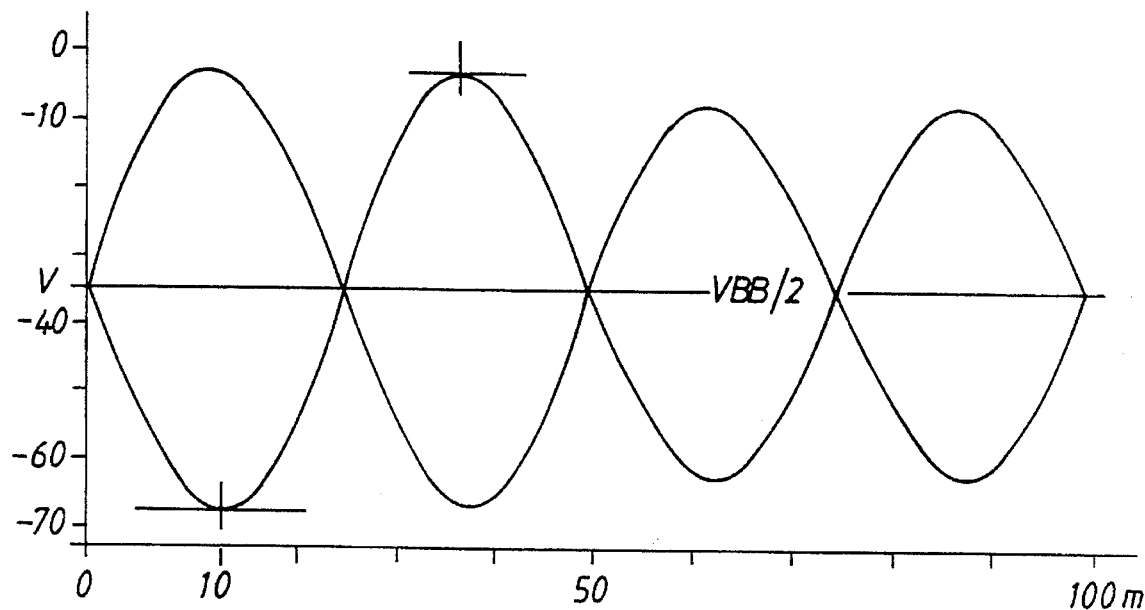
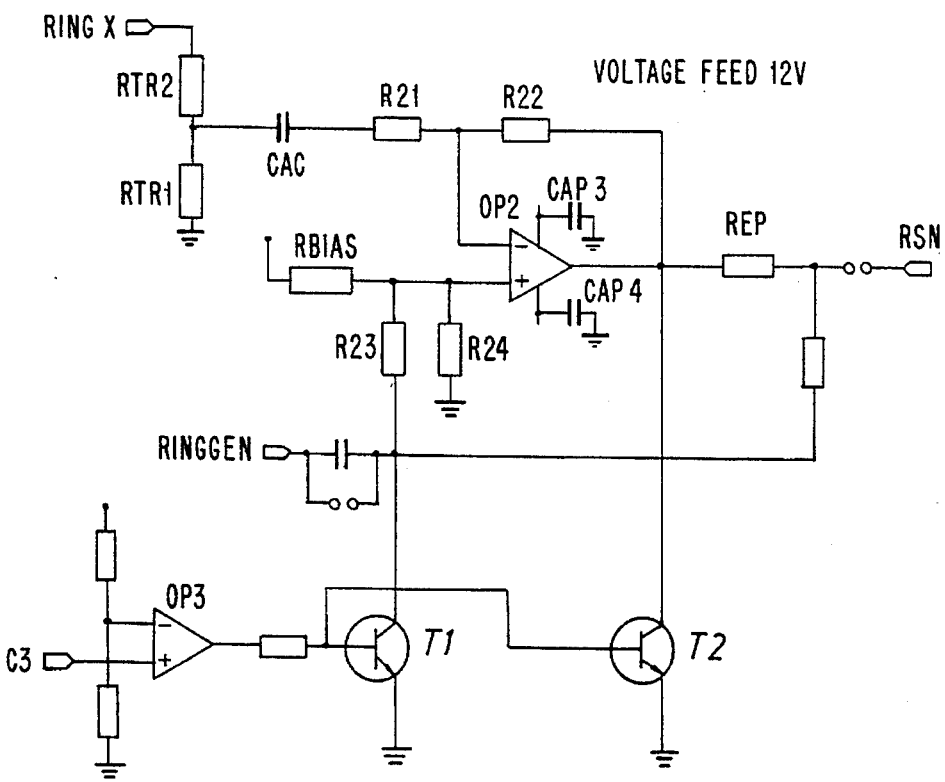

METHOD AND AN ARRANGEMENT FOR GENERATING A RINGING SIGNAL

The invention relates to a method of generating a ringing signal by means of a subscriber line interface circuit, and also to an arrangement for generating a ringing signal by means of a subscriber line interface circuit having two final stages, each for supplying an individual subscriber line wire.

The costs of installing new copper lines is increasing and constitutes a large part of the total installation costs. The capacity required by tomorrow's information community will be greater than what can be managed by present-day copper/coaxial cable systems. New telephone services will be introduced, therewith increasing the amount of information that need to be transmitted and cable television networks will be extended. Installation costs could be lowered considerably, by transmitting the telephone services and the television signals on one and the same fibre. The last piece of cable to the subscriber, however, is still in the form of a copper cable, even though the distance is considerably shorter than in the case of standard telephone lines.

Short lines do not require equally as large ringing signals from the line interface board as long lines, since in principle there is no voltage division between the bells and the telephone lines.

SUMMARY

The object of the invention is to generate the ringing signal at a lower voltage than has hitherto been normal.

This is achieved with an inventive method having the characteristic features set forth in claim 1, and with an inventive arrangement having the characteristic features set forth in claim 3.

A ringing relay is not required when the ringing signal is generated by means of the subscriber line interface circuit in accordance with the invention, thereby enhancing the reliability of the line module. This is an advantage, since the line module will become less accessible due to being placed with or in the proximity of the subscriber.

BRIEF DESCRIPTION OF THE DRAWINGS

The invention will now be described in more detail with reference to the accompanying drawings, in which

FIG. 4 illustrates the two-wire voltage when ringing;

FIG. 5 illustrates another exemplifying embodiment of the inventive arrangement.

DETAILED DESCRIPTION

Figure 1:
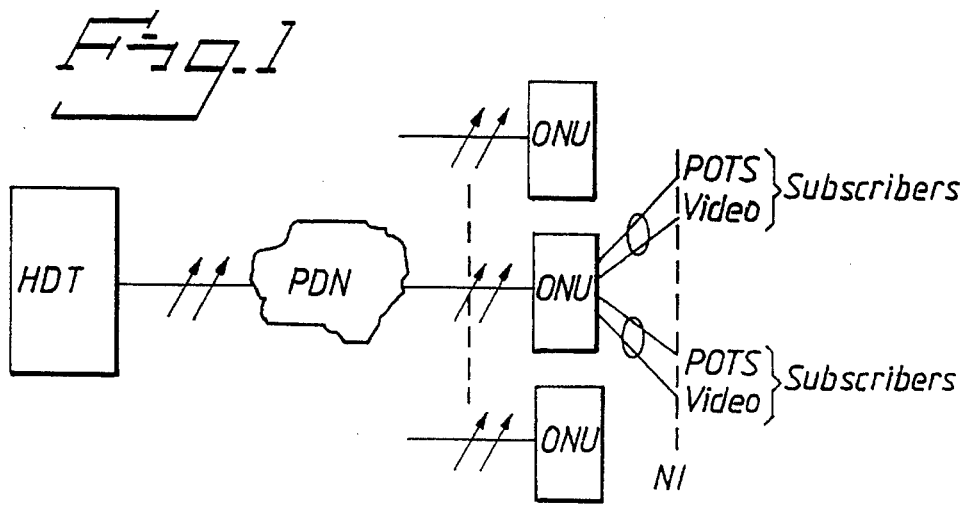
FIG. 1 is a block schematic which illustrates generally a FITL-system (Fibre In The Loop-system)

FIG. 1 illustrates the construction of a general FITL-system in which a digital host terminal HDT is connected to the local telephone exchange or switching center. The digital host terminal HDT controls a plurality of optical network units ONU through the medium of an optical, passive distribution network PDN. Conversion from optical signals to electrical signals and A/D-conversion take place in the optical network units ONU, among other things. The optical network units ONU communicate with a network interface NI in a known manner, through the medium of copper wires. Normal telephone services, referenced POTS in FIG. 1, and video services are obtained by a number of subscribers via the interface NI.

A 100 ohms line corresponds to 550 m of a 0.5 mm$^2$ AWG24-cable. A line having a length of 1 km will therefore correspond to 180 ohms of such a cable.

In the specification TA-NWT-000909 from Bellcore, it is considered that the telephone line will not exceed 500 feet, which is less than 30 ohms. A line having a length of 1 km must therefore be considered acceptable.

Figure 2:
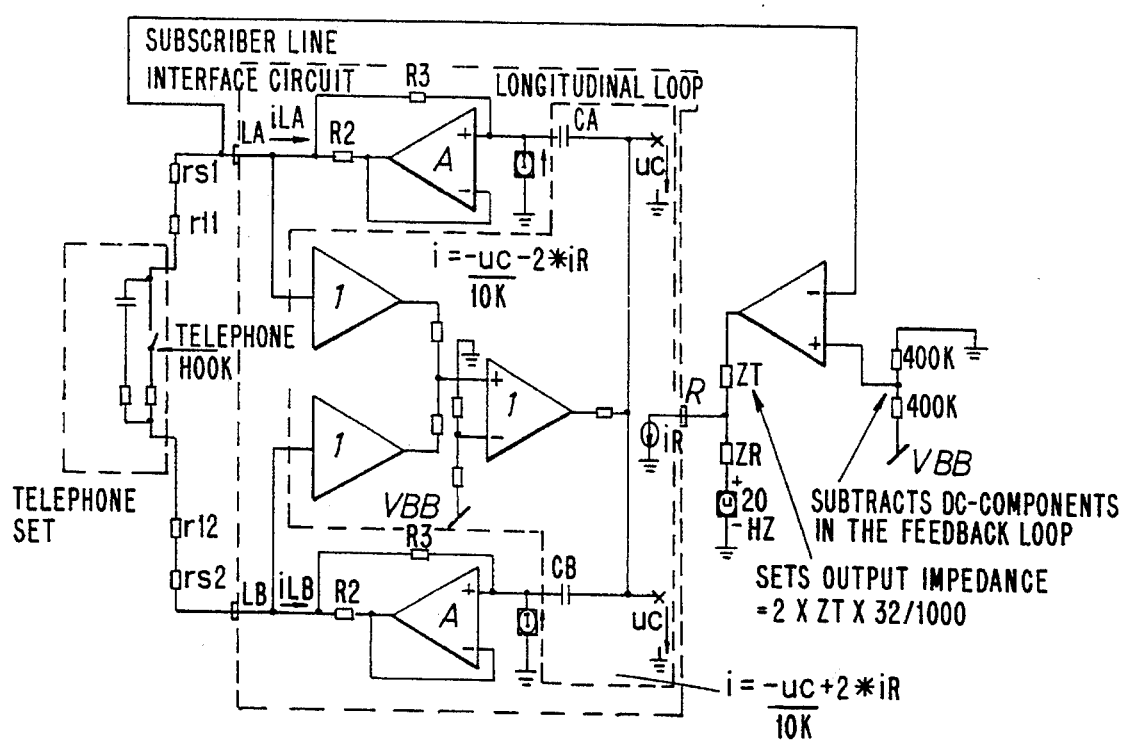
FIG. 2 illustrates one exemplifying embodiment of the inventive arrangement.

FIG. 2 illustrates a first embodiment of the inventive arrangement in a subscriber line interface circuit having two final stages A, each for supplying the a-wire and b-wire of respective subscriber line wires LA and LB of a telephone set.

In FIG. 2, the reference signs rs1 and rs2 identify protective resistors, while reference signs r11 and r12 identify line resistances.

According to the invention, one of the subscriber line wires is connected to one input terminal of an operational amplifier, the other input of which is connected to the interconnecting point between two series-connected resistors which have mutually the same resistance (400 k) and which are connected between earth and the supply voltage VBB of the subscriber line interface circuit.

The output terminal of the operational amplifier is connected to the current input terminal R of the subscriber line interface circuit via a resistor ZT. A 20 Hz signal generator U is also connected to the current input terminal R, via a resistor ZR. The current flowing through the current input terminal R supplies the final stages A of the subscriber line interface circuit, to drive the final stages to generate the ringing signal.

With a supply voltage VBB of −80 V, there is obtained a voltage having an effective value of 40 V over 5 REN at a line load of 100 ohms and a protective resistance of 2×50 ohms. The ringing signal is balanced around VBB/2 (no offset current).

The circuit operates as follows:

The input signal, which has an effective value of about 1 V, is generated centrally by the signal generator U. The amplification 4-wire —>>2-wire in an open line is set by the quotient between ZT×32×2 and the resistor ZR. The current from the input signal and the feedback to the R-input is amplified 1,000 times to the outputs LA and LB of the final stages A. The current delivered to LA is phase-shifted through 180°, whereas the current delivered to LB is in phase. The direct current component of the signal fed back to the operational amplifier is subtracted by adding half the supply voltage VBB in the operational amplifier.

The internal longitudinal loop centers LA and LB symmetrically around half the supply voltage VBB, as evident from FIG. 4.

Bellcore's requirement concerning the generation of a ringing signal is not fulfilled completely with the aid of the invention, but that certain exceptions must be made without jeopardizing the subscriber ringing function.

The ringing signal centered around half the supply voltage VBB is generated over the outputs LA and LB on the a-wire and b-wire respectively. The a-wire shall lie "close to" earth potential in the ringing pause and the b-wire shall lie on a negative voltage which is equal to the voltage in the rest state, the supply voltage being equal to −80 V.

The supply voltage is thus lower than in the case of unbalanced ringing.

Figure 3:
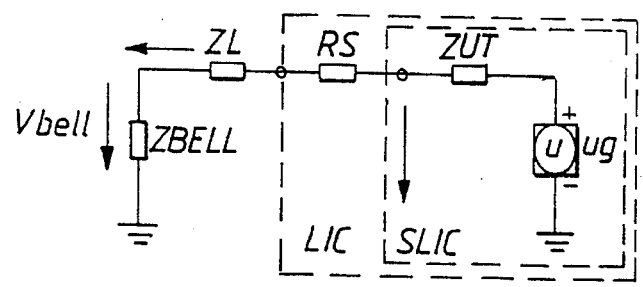
FIG. 3 illustrates a subscriber line interface circuit equivalent of two final stages.

FIG. 3 illustrates a subscriber line interface circuit equivalent of two final stages, wherein ZUT signifies the output impedance which is roughly equal to 2×70 ohms, RS signifies the protective resistances, which are roughly equal to 100 ohms, ZL signifies the line impedance, which lies between about 0–200 ohms, ZBELL signifies the impedance of the bell, this impedance lying between about 1.4 and 7 kohm, and wherein LIC signifies the line interface board, and ug signifies the ringing generator voltage.

FIG. 5 illustrates a second embodiment of the invention in which an existing subscriber line interface board is used to generate the ringing signal with the aid of a subscriber line interface circuit.

The voltage across RINGX, which corresponds to LB in FIG. 2, is divided by resistors RTR1 and RTR2. The direct current component is removed with the aid of the capacitor CAC. The feedback signal is then buffered via the operational amplifier Op2 and then applied to the current terminal RSN, which corresponds to R in FIG. 2, via the resistor Rep, which corresponds to ZT in FIG. 2. Since the application is effected on an existing solution, a bias current and part of the input signal are added so as to remove the current that arrives from the direct current loop consisting of the resistors Rbias, R23 and R24. The transistors T1 and T2 close the ringing function when a logic 1 occurs across C3.

Figure 6:
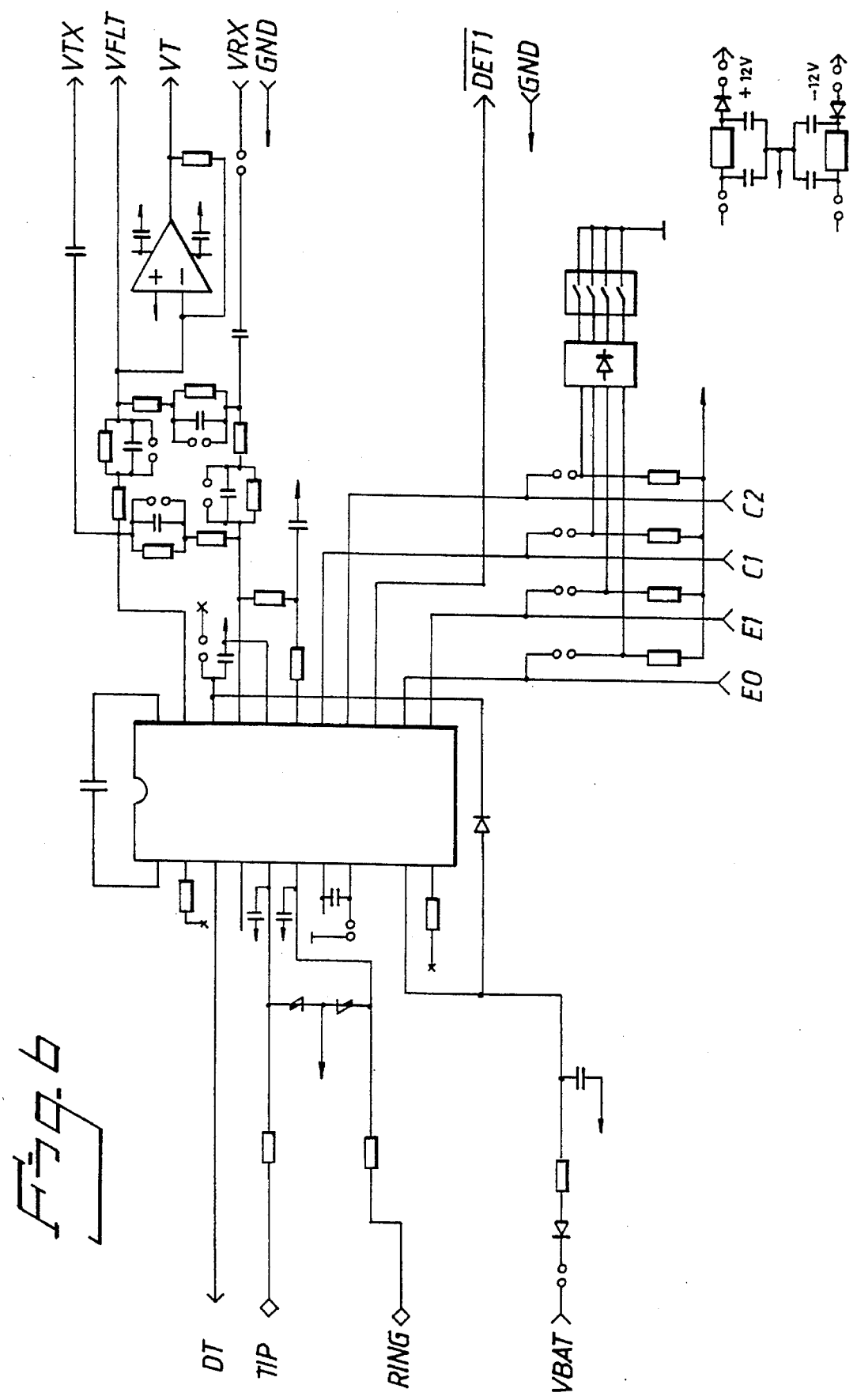
FIG. 6 illustrates activation of the FIG. 5 embodiment on an existing test board.

FIG. 6 illustrates an example of where and how the embodiment illustrated in FIG. 5 is set up on an existing test board.

The lower ringing signal voltages on the line interface board in accordance with the invention thus enable ringing to be effected with the aid of an integrated subscriber line interface circuit, thereby eliminating the need for a standard ringing relay. In order to place the lowest possible voltage requirements on the ringing signal, there is utilized in accordance with the invention balanced ringing which is centered around half the supply voltage with low output impedance, in comparison with a conventional ringing generator.

What is claimed is:

1. A method of generating a ringing signal by means of a subscriber line interface circuit, which comprises applying a voltage which is a function of an output voltage of the subscriber line interface circuit over a first resistor, to generate a first current;

applying the output voltage of a signal generator over a second resistor, to generate a second current; and adding the first and the second currents together to obtain an input current to final stages of the subscriber line interface circuit so as to drive said final stages to generate the ringing signal.

2. A method according to claim 1, wherein the voltage that is a function of the output voltage of the subscriber line interface circuit is comprised of the output voltage of said subscriber line interface circuit from which a direct current component has been subtracted.

3. An apparatus for generating a ringing signal including a subscriber line interface circuit with two final stages, each for supplying an individual subscriber line wire, wherein one subscriber line wire is connected to one input of an operational amplifier whose other input is connected to an interconnecting point between two series-connected resistors having mutually the same resistance;

an output of the operational amplifier is connected to a current input terminal of the subscriber line interface circuit via a first resistor; and a signal generator is also connected to said current input terminal via a second resistor, wherein the current input terminal functions to supply current to the final stages to drive said stages to generate the ringing signal.

4. An apparatus according to claim 3, wherein the two resistors of mutually equal resistance are connected between earth and the supply voltage of the subscriber line interface circuit.

* * * * *